US008973138B2

(12) United States Patent
Byrkit et al.

(10) Patent No.: US 8,973,138 B2
(45) Date of Patent: Mar. 3, 2015

(54) SECURE LAYERED ITERATIVE GATEWAY

(75) Inventors: Mark E. Byrkit, Hagerstown, MD (US); Francis W. Murray, Columbia, MD (US)

(73) Assignee: The Johns Hopkins University, Baltimore, MD (US)

(*) Notice: Subject to any disclaimer, the term of this patent is extended or adjusted under 35 U.S.C. 154(b) by 269 days.

(21) Appl. No.: 13/461,948

(22) Filed: May 2, 2012

(65) Prior Publication Data
US 2013/0298219 A1 Nov. 7, 2013

(51) Int. Cl.
*G06F 15/16* (2006.01)
*H04L 29/06* (2006.01)

(52) U.S. Cl.
CPC ........ *H04L 63/1416* (2013.01); *H04L 63/1425* (2013.01)
USPC .................... 726/23; 726/22; 726/24; 726/12

(58) Field of Classification Search
None
See application file for complete search history.

(56) References Cited

U.S. PATENT DOCUMENTS

| | | | |
|---|---|---|---|
| 5,745,669 A | 4/1998 | Hugard et al. | |
| 7,391,299 B2* | 6/2008 | Bender et al. | 340/292 |
| 7,656,189 B1 | 2/2010 | Trimberger | |
| 7,743,260 B2 | 6/2010 | Fetik | |
| 7,774,844 B1 | 8/2010 | Chehadeh et al. | |
| 8,250,654 B1* | 8/2012 | Kennedy et al. | 726/22 |
| 2003/0145228 A1* | 7/2003 | Suuronen et al. | 713/201 |
| 2004/0259640 A1 | 12/2004 | Gentles et al. | |
| 2005/0066178 A1 | 3/2005 | Rowe et al. | |
| 2005/0176415 A1 | 8/2005 | Jang et al. | |
| 2005/0177746 A1* | 8/2005 | Bunn et al. | 713/201 |
| 2007/0289019 A1 | 12/2007 | Lowrey | |
| 2007/0291650 A1* | 12/2007 | Ormazabal | 370/244 |
| 2008/0141371 A1 | 6/2008 | Bradicich et al. | |
| 2008/0256635 A1 | 10/2008 | Gassoway | |
| 2009/0126002 A1 | 5/2009 | Vail et al. | |
| 2010/0306826 A1 | 12/2010 | Kestner et al. | |
| 2011/0060947 A1 | 3/2011 | Song et al. | |

* cited by examiner

*Primary Examiner* — Matthew Henning
(74) *Attorney, Agent, or Firm* — Noah J. Hayward

(57) ABSTRACT

In methods and a device for mitigating against cyber-attack on a network, a distributed intermediary device is placed into a network between computers or network nodes of the network to mitigate cyber-attacks between the computers or nodes of a network from remote systems. Threats are assessed by utilizing internal information assurance mechanisms of the device to detect such cyber-attacks without requiring external modification of the software and/or hardware of the computers or nodes of the network to be protected. The device prevents attacks at the platform level against the OS and network resources.

13 Claims, 9 Drawing Sheets

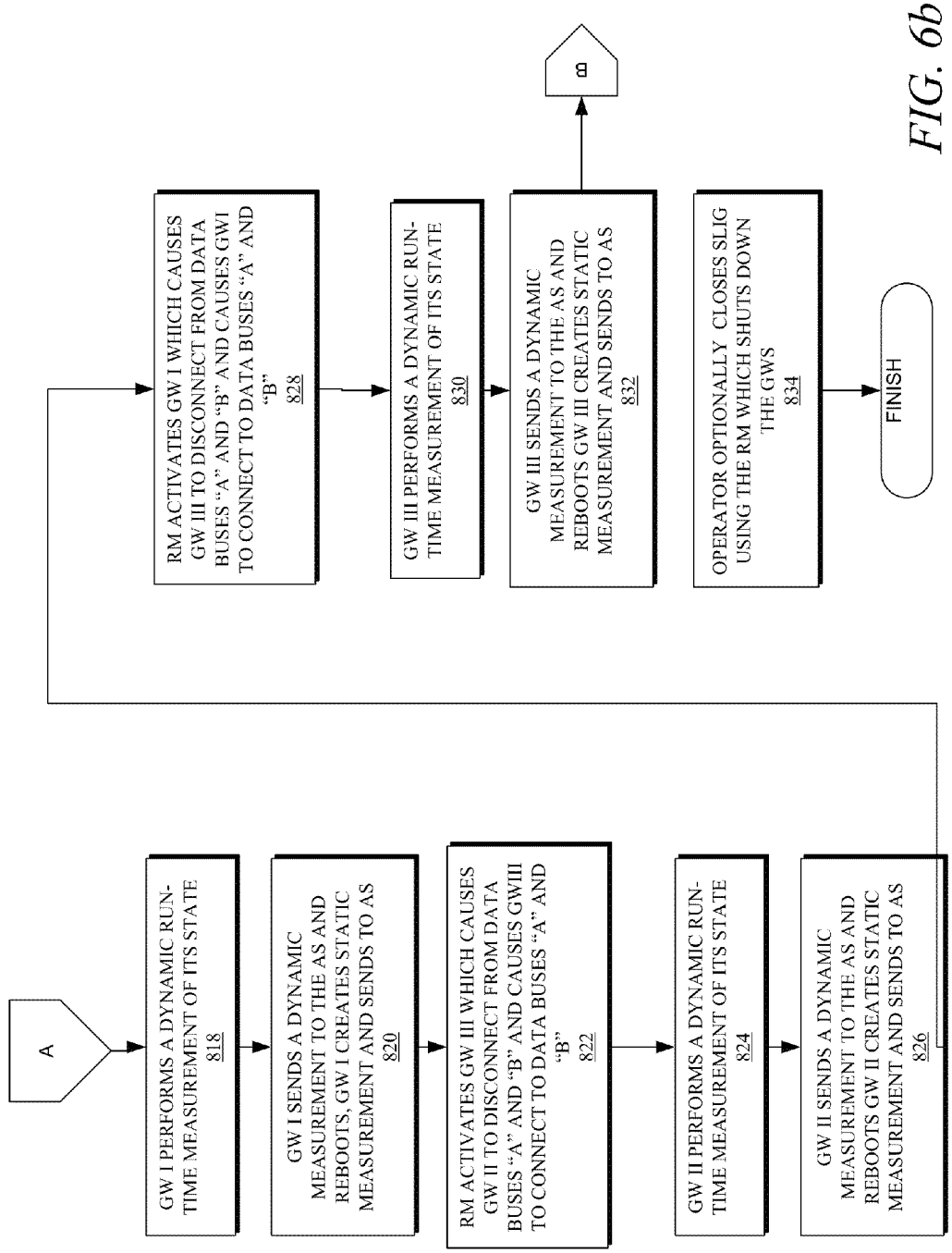

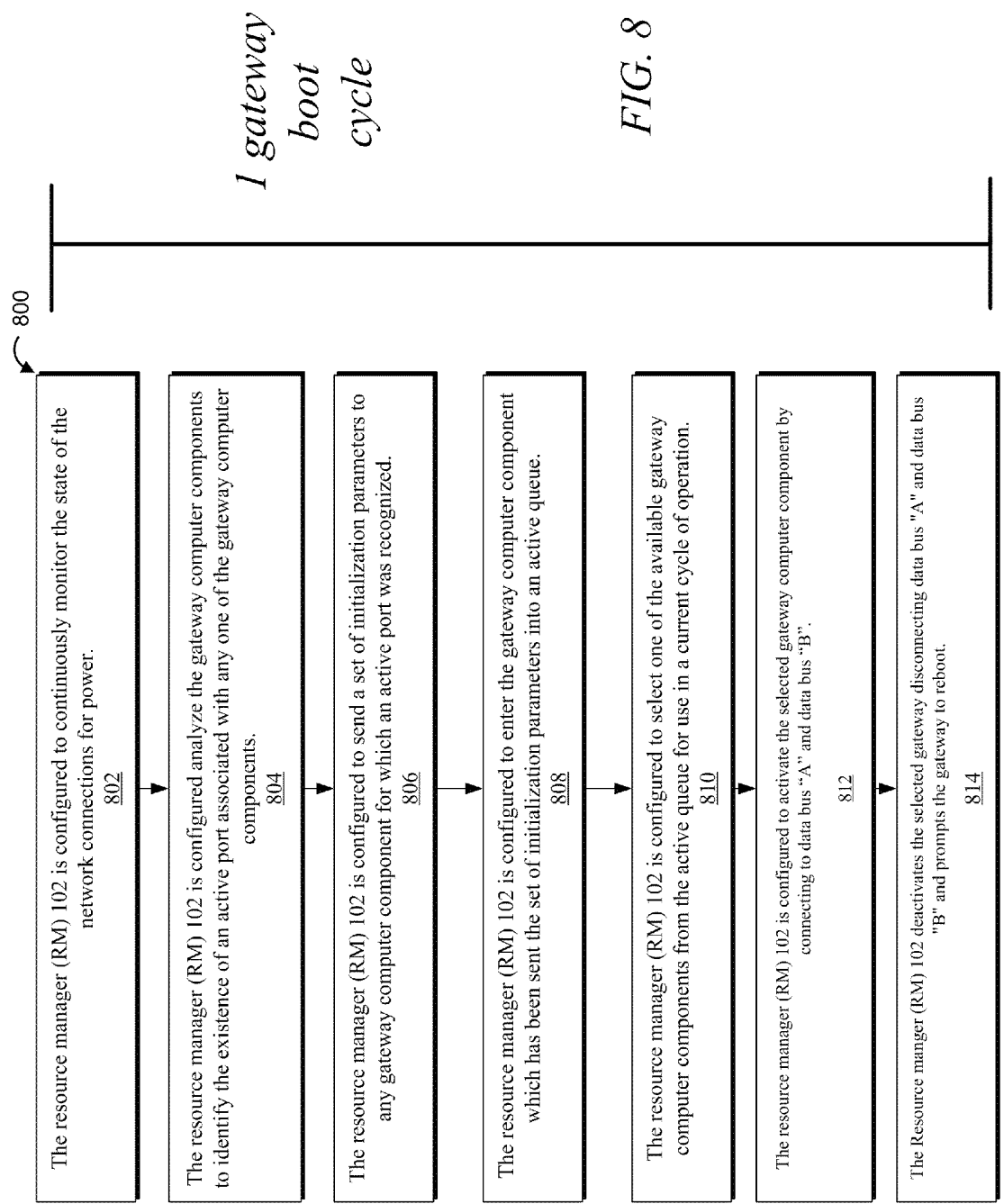

SECURE LAYERED ITERATIVE GATEWAY

BACKGROUND OF THE INVENTION

1. Field of the Invention

The present disclosure relates generally to security and, more particularly, to a device and associated method for assessing and mitigating threats to computer systems and/or nodes on a network.

2. Description of the Related Art

Next generation cyber threats are emerging in the form of powerful Internet services and tools that automate intelligence gathering, planning, testing, and surveillance. This generation of increasingly sophisticated and automated intelligence-driven cyber attacks, which are often coordinated across multiple domains, are difficult to defeat or even understand with current technology. To defeat such cyber attacks, information assurance (IA) threats are compared against known IA signatures. The known IA signatures require remote access and local access to an intrusion prevention system (IPS). This is undesirable in that remotely accessing a network to consistently provide information assurance (IA) threats is cumbersome and prone to failure. A further drawback of such an approach is that signature modification of the software and/or hardware configuration of the computers or nodes of the network is required.

Accordingly, a need exists for systems and methods that utilize internal information assurance mechanisms to detect cyber attacks without requiring external modification of the software and/or hardware of the computers or nodes of a network.

SUMMARY OF THE INVENTION

Therefore, exemplary embodiments of the present invention have been made in view of the above problems, and these exemplary embodiments include, but are not limited to, a system, device and associated methods for intercepting and blocking cyber activity between computers or network nodes of a network.

Exemplary embodiments of the present invention include a distributed intermediary device, referred to as a Secure Layered Iterative Gateway (SLIG), that is placed into a network environment, such as, for example, an internet protocol (IP) based network, between system computers or network nodes of the network to provide protection and detection of cyber-attacks between the computers or nodes of a network from remote systems. The SLIG can also be utilized to provide a security bridge between two distinct networks or systems by providing a layer of protection for computers on one network in the case that computers on the other network have been compromised by an attacker. Threats are assessed by utilizing internal information assurance mechanisms to detect cyber attacks without requiring external modification of the software and/or hardware of the computers or nodes of the network. The SLIG prevents attacks against the operating system (OS) and network resources, for example.

The SLIG overcomes severe limitations on modifying any system or combination of systems, by interposing implementations of itself into networks that connect major sub-systems or within huge sub-systems. The SLIG effectively partitions each existing network into two network segments as a security mechanism that controls the network traffic between the two network segments, while not compromising normal systems operations.

In one aspect, the SLIG while providing a controlled interface, would also act as an IA sensor noting non-normative operations and attempts to take over the device interface.

The SLIG includes a number of separate gateway components (e.g., computers) which are activated in a 'round robin' or similar fashion, such that only one of the gateway components is active at any time. The assignment of a particular gateway component is made by a physical machine resource manager (PMRM). The gateway components are monitored by an Attestation Manager (AM), which makes a measurement of a gateway computer during boot and after it has completed its turn in the round robin as the active gateway. This provides an indication if the gateway was compromised during its time as the active gateway computer. The measured gateway computer is then rebooted to be ready for its next turn as the active gateway.

In an exemplary embodiment, the gateway computers are booted under a 'trusted boot' and run for only a short period of time, typically a few to ten seconds. The target time for a single system is under a second. After this period, the gateway connection is switched to the next machine in the 'round robin' by the physical machine resource manager (PMRM) and the attestation manager (AM). In one embodiment of the present invention, the switch and management hub may include, but is not limited to, Cisco ME 3400 (switch), Cisco SG102-24 (management node hub). A measurement is then invoked on the first gateway computer by the attestation manager (AM) and a report is sent to the attestation manager (AM). The first gateway computer is then powered down in preparation for the next 'trusted boot' in the 'round robin' cycle.

A typical attack needs to compromise the SLIG before it can compromise computers that the device is protecting. For example, consider that system A is compromised and the attacker is intending to spread its attack to system B via a network N. A type of attack that is of potential concern is that of compromising the MAC layer access of system B. Interposing the SLIG between systems A and B by breaking network N into networks Na and Nb provides isolation to system B. That is, the attacker on system A now sees the distributed intermediary device as system B and tries to attack it using a MAC layer attack. The SLIG seeks to mitigate this attack by several techniques including: a simple device operating system and application implementation that reduces the attack surface compared to the entire system B, a round robin technique that forces the attacker to restart the attack at every switch of a gateway computer, sensor monitoring by the AM of each platform in the round robin to discover a compromise.

More specifically, the inventive SLIG, in one embodiment, comprises a physical machine resource manager is adapted to open the SLIG to network traffic by indicating to one of at least two gateway components to open up its port to network traffic, control traffic flow from one gateway component to the next in round robin or similar fashion, continuously monitor network connections to determine when the gateways are available to be opened, begin the process of iterating through the at least two gateways and monitor the state of network connections for power. The attestation server component is adapted to receive messages from each of the gateways as the gateways begin their boot cycle, examine hashes produced by each gateway to determine if a boot cycle has been compromised and at least two gateways adapted to provide packet routing across the distributed device between two connected systems or network nodes, provide basic firewall services disallowing ports not indicated by the physical machine resource manager component in a start up message, provide rate based IP packet analysis to deny IP based denial of service attacks, receive reboot messages from the physical machine resource manager to stop acting as a packet router by flushing remaining IP buffers onto the network, using internal IA sensors to determine if changes have occurred to the gateway's operating system (OS), system memory or firmware associated with the network interface cards (NICs), hard drive and video cards.

Exemplary embodiments of the present invention include, for example, a method for intercepting and blocking cyber activity between computers or network nodes of a network via an intermediary distributed device. The method involves the following steps: (a) activating by a physical machine resource manager of activating, by a physical machine resource manager of the intermediary distributed device, one of at least two gateway components of the intermediary distributed device; (b) communicatively coupling a first network node and a second network node via the activated gateway component to allow data to be bi-directionally transmitted between the first and second network nodes for a finite time period; (c) de-activating, by the physical machine resource manager, the activated gateway component at the termination of the finite time period; (d) analyzing data obtained by the activated gateway component during the finite time period by an attestation server to determine if cyber activity has occurred; (e) rebooting the activated gateway component; (f) repeating steps (a)-(e) utilizing another one of the at least two gateway components not previously selected in the most recent finite time period.

According to still another exemplary embodiment of the invention, one or more program elements (e.g., a software routine, in source code or executable code) are provided, which, when being executed by one or more processors, is adapted to control or carry out a data processing method having the above mentioned features. In one embodiment of the present invention, software routines may be written in, but are not limited to, JAVA®, C, or PERL®.

In addition to the method set forth above, the exemplary embodiments of the present invention also provide a computer program product for implementing the above described method.

Implementations can realize one or more of the following advantages and features. The ability to defeat network attacks without requiring modification of the software or hardware configuration of the computers or nodes of the network. The ability to provide a hardware and operating system surface that can be attacked instead of the computers to which it is connected and is protecting. Decreased penetration is realized by remote malware that targets hardware firmware. Network stack and Operating System via IP linked network connections. No change to fielded system components is required. An IA sensor is provided for malware intrusion. Low latency is realized for packet transmission across the SLIG. IA control limits or excludes communication between system components (i.e., a data tight door). Regenerative third generation IA control and continued capability during an active cyber attack.

BRIEF DESCRIPTION OF THE DRAWINGS

These and other objects, features and advantages of exemplary embodiments of the invention will be apparent from a consideration of the following detailed description of an example embodiment when taken together with the accompanying drawings, in which:

FIG. 8 is a flowchart of steps performed in accordance with one embodiment of the present invention for actions performed by the resource manager in each cycle of operation of the SLIG.

DETAILED DESCRIPTION

Figure 1:
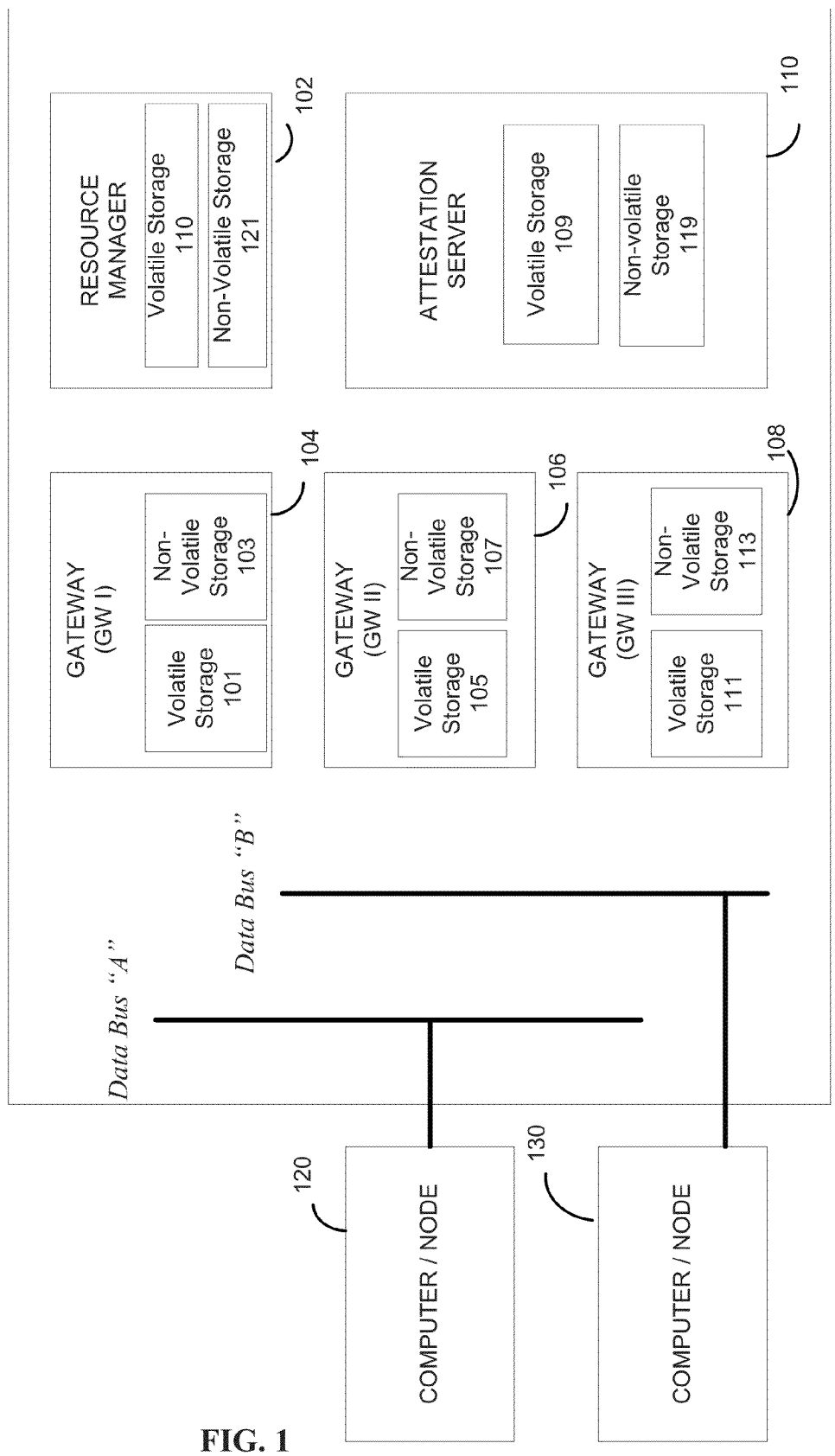
FIGS. 1-5 are diagrams illustrating the elements of an exemplary embodiment of a distributed device and further illustrates an operational flow of data between the respective elements of the device in a single cycle of operation.
Figure 2:
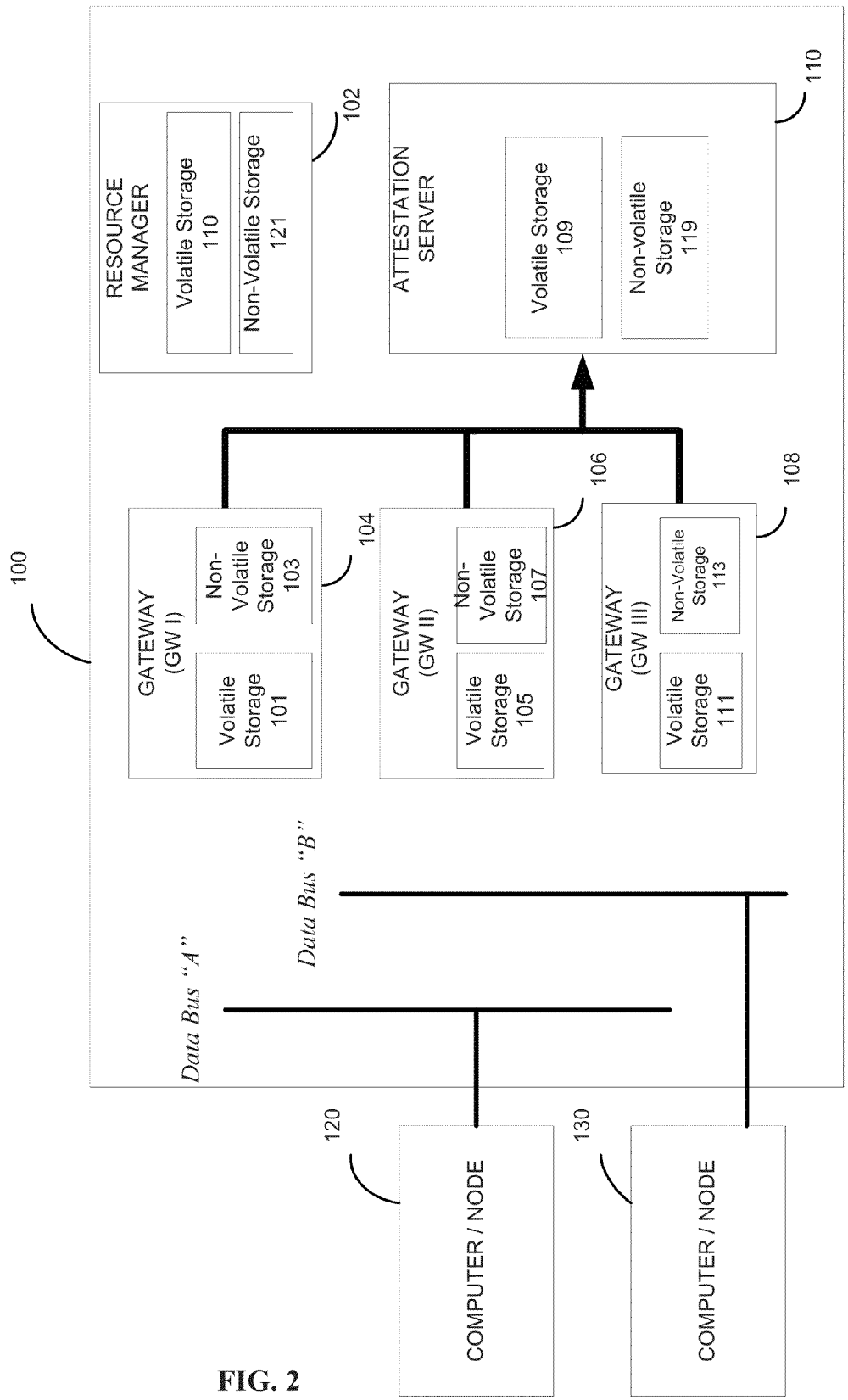

The following exemplary embodiments are set forth to aid in an understanding of the subject matter of this disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

It should be appreciated that exemplary embodiments of the present invention can be implemented in numerous ways, including as a process, an apparatus, a system, a device, a method, or a computer readable medium such as a computer readable storage medium or a computer network where program instructions are sent over optical or electronic communication links. Several inventive embodiments of the present invention are described below. It should, thus, be understood that the description to follow is intended to be illustrative and not restrictive, and that many other embodiments will be apparent to those of skill in the art upon reviewing the description.

The specific embodiments described herein are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

Exemplary Computing Architectures and Environments

In its various forms, the exemplary embodiments can be implemented within a network architecture between computers and nodes of the network architecture or may otherwise be implemented in a network architecture between two distinct networks or systems in that it provides a layer of protection for computers on one network in the case that computers on the other network have been compromised by an attacker. The network architecture mitigates cyber attacks between computers and from remote systems. Internal information assurance (IA) sensors are used to detect such cyber attacks and respond by rebooting (i.e., regenerating) a particular internal gateway computer of the SLIG that has been attacked, thereby denying hostile cyber control of internal gateways, physical machines or network interfaces.

Although certain aspects for a user's computer system may be preferred in the illustrative embodiments, exemplary embodiments of the present invention should not be unduly limited as to the type of computers on which it can be implemented, and it should be readily understood that embodiments of the present invention indeed contemplates use in conjunction with any appropriate information processing device (IPD) having the capability of being configured in a manner for accommodating the particular embodiment. Moreover, it should be recognized that the exemplary embodiments described herein could be adaptable for use on computers other than general purpose computers (e.g. embedded computers), as well as general purpose computers without conventional operating systems.

General Architecture

The general architecture of a SLIG is that of a distributed intermediary device placed in a network between systems computers in an IP network environment to mitigate attacks between computers. The SLIG is configured to provide protection and detection against attacks originating from either system.

FIG. 1 illustrates the essential elements of a distributed intermediary device, referred to herein as a secure layered iterative gateway (SLIG). There is shown in FIG. 1, wherein like reference characters refer to like parts, a SLIG 100 which includes: a physical machine resource manager component (PMRM) 102, three gateway computer components, GW I 104, GW II 106, GW III 108 and an attestation manager component, i.e., server (AS) 110. Three gateway computer components are shown for ease of illustration and not limitation. It should be understood that the number of gateway computer components may vary in accordance with an intended application. The number of components used may depend on one or more factors, such as, for example, the speed of the network, the time required for individual gateway to reboot, the desired time for each gateway to be active. In some embodiments the desired time in which a gateway is to be active is substantially on the order of approximately 1 to 5 seconds. Active times under 1 second are also within contemplation of exemplary embodiments of the invention.

In an embodiment, the gateway computer components 104, 106, 108, can be "switched" in round robin fashion on each network packet. The amount of time that an individual gateway computer component is active increases the likelihood that an attacker could exploit a gateway and both NIC cards to gain unfettered access through the SLIG. The goal in setting the time for each gateway computer component to be active is to decrease the time that the attacker can attack the gateway computer component before the gateway computer component is deactivated.

The physical machine resource manager component (PMRM) 102 functions in one aspect to monitor the state of the network connections for power. The physical machine resource manager (PMRM) 102 also functions to assign a particular gateway computer component (GW) 104 as being a currently active computer component. Currently active is defined herein as having a port of the gateway computer component open to traffic. The series of gateway computer components, 104, 106, 108 are activated by the physical machine resource manager (PMRM) 102 in a round-robin or similar fashion such that only a single gateway computer component is active at any point in time.

The gateway computer components 104, 106, 108 are configured to provide packet routing across the (SLIG) 100 between connected systems (i.e., computer nodes 120, 130) which are to be protected by the SLIG 100 from being compromised by attackers. The attestation server (AS) 110 is configured to receive messages from each of the gateway computer components 104, 106, 108 as each gateway computer component 104, 106, 108 begins it boot cycle in iterative fashion. The attestation server (AS) 110 is also configured to examine a hash produced by an internal IA sensor associated with each gateway computer component 104, 106, 108 as the attestation server (AS) 110 is instructed to reboot by the physical machine resource manager (PMRM) 102. As will be explained in more detail below, each of the hashes produced by the respective gateway computer components is examined by the attestation server (AS) 110 to determine if a compromise has occurred.

One feature of the SLIG 100 is that the attestation server (AS) 110 could send a compromise report across all systems protected by the (SLIG). In an embodiment, a compromise report may consist of the type of intrusion or system modification detected.

Operation

Figure 5:
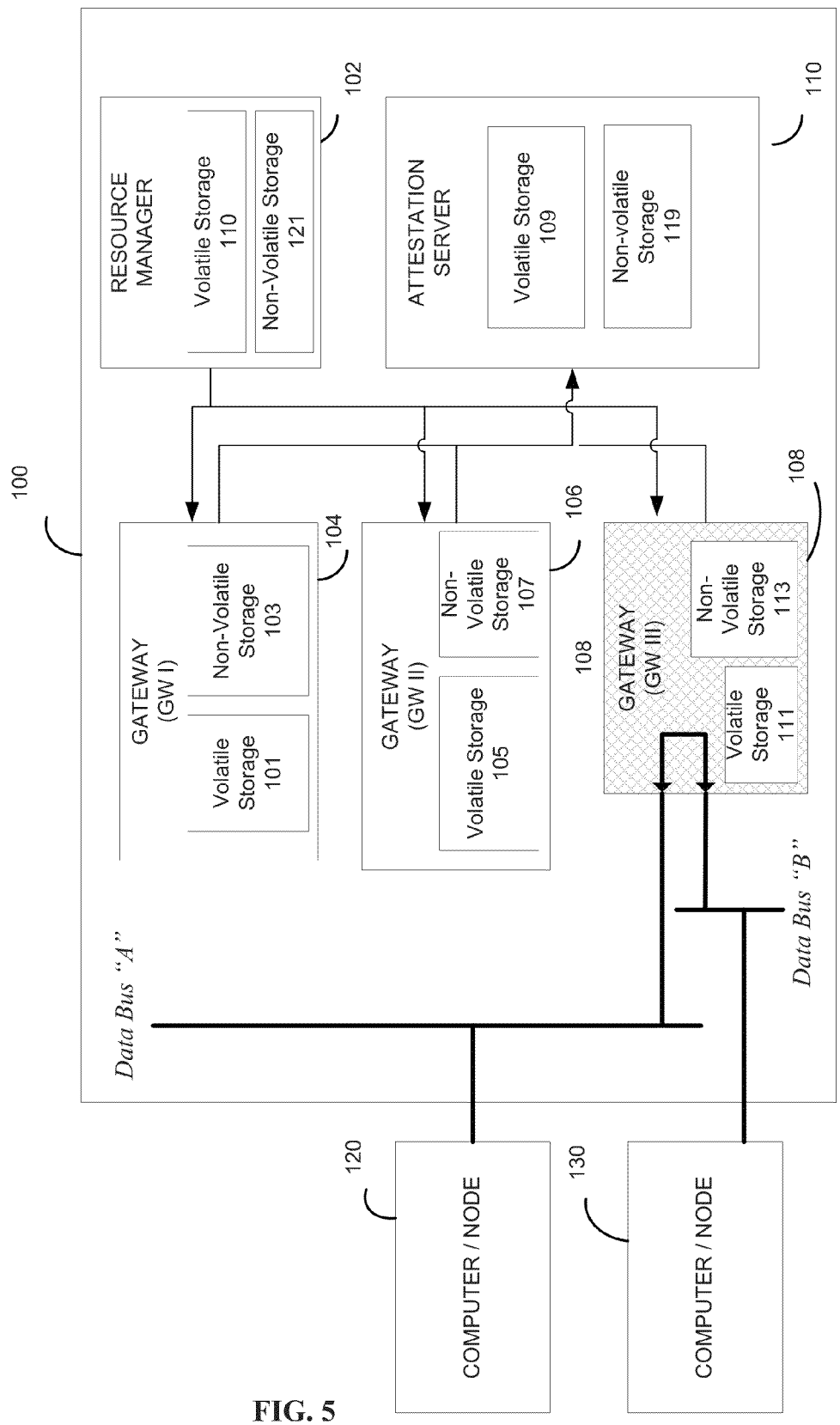
Figure 6A:
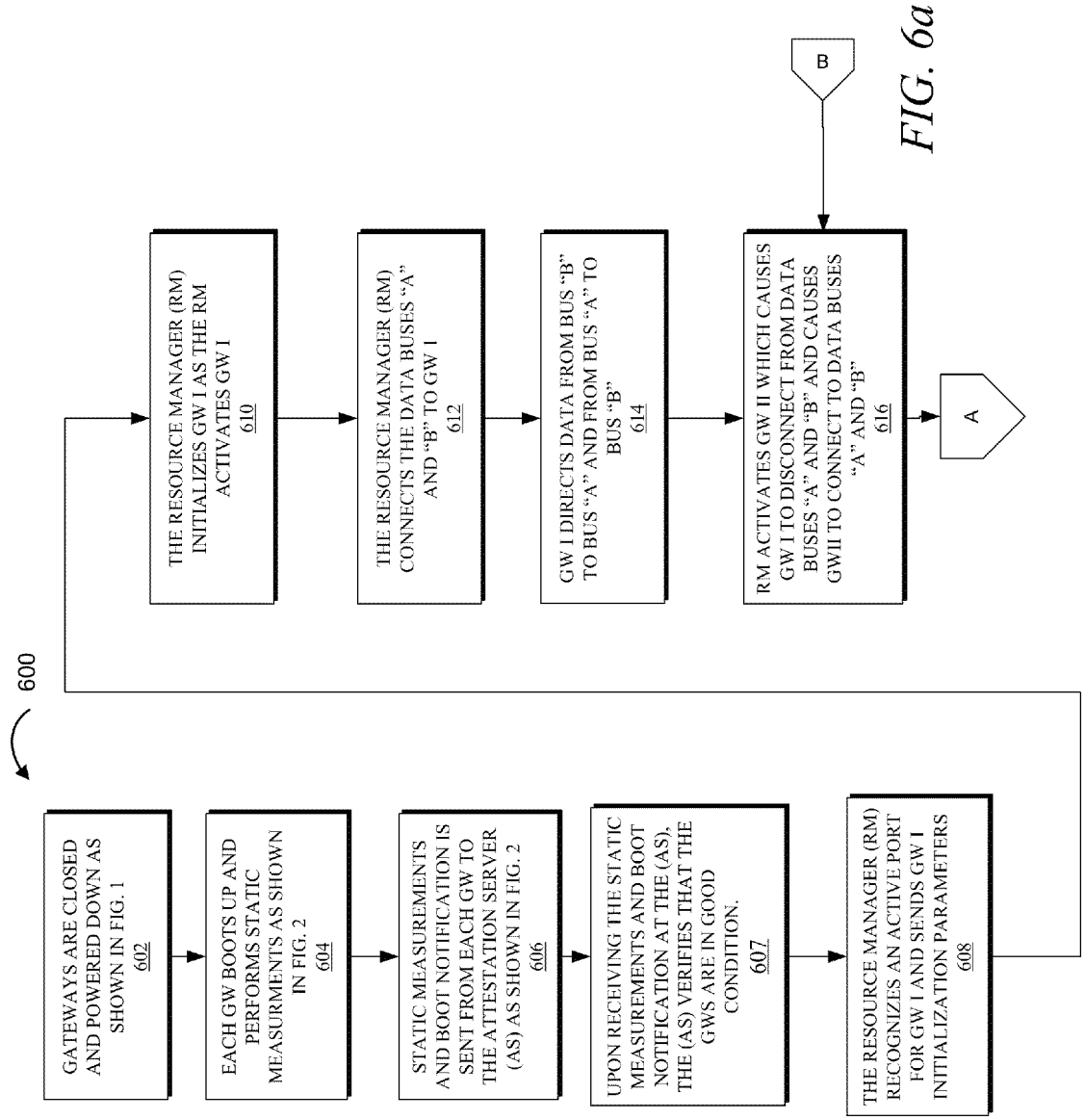
FIG. 6 is a flowchart of steps performed in accordance with one embodiment of the present invention for intercepting and blocking cyber activity between computers or network nodes of a network via an intermediary distributed device comprised of a physical machine resource manager component, attestation server component and at least two gateway components.

FIG. 6 are a flowchart 600 of steps performed in accordance with one embodiment of the present invention for intercepting and blocking cyber activity between computers or network nodes of a network via an intermediary distributed device comprised of a physical machine resource manager component, attestation server component and at least two gateway components. Flowchart 600 includes processes which, in one embodiment, are carried out by processors and electrical components under the control of computer readable and computer executable instructions. The computer readable and computer executable instructions reside, for example, in data storage features such as computer usable volatile memory 101, 109, 110 and/or computer usable non-volatile memory 103, 107, 113 associated with the respective components 102, 104, 106, 108, 110 of the SLIG 100 of FIGS. 1-5. However, the computer readable and computer executable instructions may reside in any type of computer readable medium. Although specific steps are disclosed in flowchart 600, such steps are exemplary. That is, exemplary embodiments of the present invention are well suited to performing various other steps or variations of the steps recited in FIG. 6. Within the present embodiment, it should be appreciated that the steps of flowchart 600 may be performed by software, by hardware or by any combination of software and hardware.

At step 602, the SLIG 100 is in a quiescent state, as shown in FIG. 1. The gateway computer components 104, 106, 108 are closed and powered down, physically disconnected from the physical machine resource manager (PMRM) 102 and the attestation server (AS) 110.

In one embodiment of the invention, a default connection could be maintained in the powered down state. At this point, the physical machine resource manager (PMRM) 102 and attestation server (AS) 110 have performed their initializations. The physical machine resource manager (PMRM) 102 has verified its control connection to the data buses "A" and "B" and it is quiescent awaiting the identification of an active gateway computer component 104, 106, 108.

At step 604, each of the gateway computer components 104, 106, 108 boots up to perform static measurements to assert that the gateway computer components 104, 106, 108 are in a known good state. These measurements may include but are not limited to; hash generation of the OS software, boot proms and assessment and verification using the Trusted Platform Module (TPM). In addition to performing static measurements, hashes are generated for the BIOS and Firmware of the NICS.

As is well known to those skilled in the art, a Trusted Platform Module (TPM) allows an entity to create measurements of software. A measurement of software is referred to as an integrity metric. A sequence of measurements causes a sequence of these integrity metrics. A single integrity metric or a sequence of integrity metrics can be measured again into another integrity metric. This "measurement" of measurements can be used to determine whether the underlying software stack is valid/authorized or not based on a single metric.

At step 606, the static measurements previously performed at step 604 during boot-up are independently sent along with a boot notification from each gateway (GW) 104, 106, 108 to the attestation server (AS) 110 as each gateway (GW) 104, 106, 108 boots.

At step 607, upon independently receiving the static measurements and boot notification from the gateways (GWs) 104, 106, 108 at the attestation server (AS) 110, the (AS) 110 verifies that the gateway (GW)s 104, 106, 108 are in good condition. If not, an alert is generated for the operator. In response to such an alert, the operator upon determining the severity of the malware attack may take one or more of the following actions:
- change the mode of the SLIG to make it more restrictive (i.e., mode change from "open" to "filtering";
- Add additional ports or protocols to the filtering list; decrease the packet size constraint, increase the packet size constraint;
- close the SLIG 100, i.e. change the mode of the SLIG 100 to "closed" (note in the "closed" state the SLIG 100 will still collect attack metrics across the SLIG's interface);
- change the mode to "routing" (this most likely would require additional changes to the configured systems of networks.

There are many additional actions that an alert operator could take to secure the network in addition to those described above. For example, if persistent malware exists on a gateway GW, as alerted by the AS, the operator may remove a gateway GW from the available list and reimage the GW's operating system and BIOS from the physical machine resource manager (PMRM) 102. In an embodiment, the reimaging of the gateway GW may be automated. In one embodiment of the present invention, the operating system may include, but are not limited to, Tiny Core LINUX®, DEBIAN® LINUX® and Knoppix LINUX®.

Figure 3:
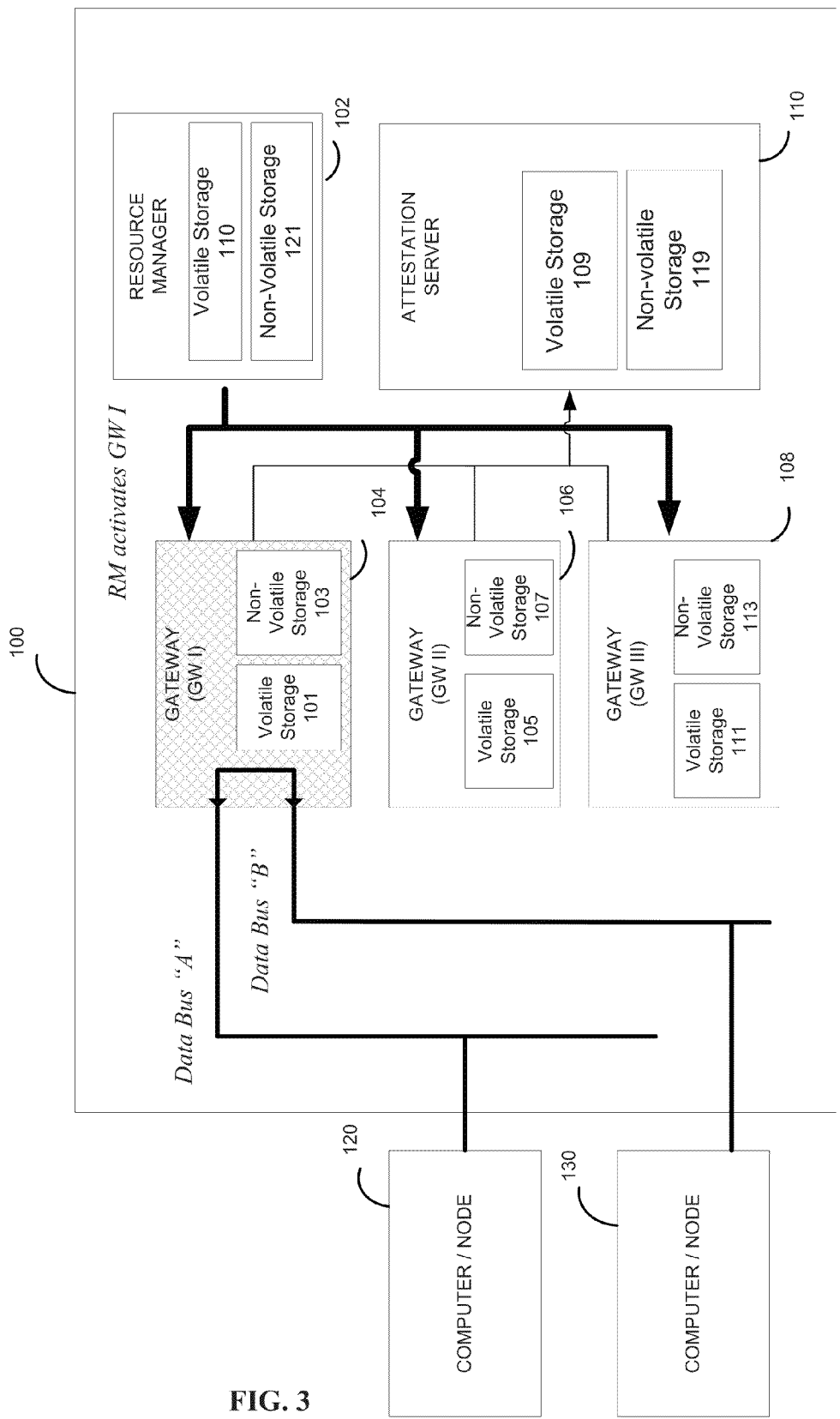

With reference now to FIG. 3, at step 608, the physical machine resource manager (PMRM) 102 recognizes an active port for gateway GW I 104. The physical machine resource manager (PMRM) 102 sends gateway GW I 104 initialization parameters that include the allowed port protocols and any temporal filtering parameters, packet size constraints and gateway state for gateway GW I 104. The initialization parameters allow changes to the SLIG 100 operation mode by constricting data types and ports or allowing data types and ports, dependent on the activities of attackers that are hostile to the network the SLIG 100 is protecting. This would allow some data exchanges during times of low hostile cyber activity and restrict them when the operator detects a change in the attacker's activity. The ports protocols and packet constraints may always be in the most constrictive state, but the SLIG 100 is configurable to meet changing cyber activities.

It should be understood that the boot order of the GWs does not have to be determinate. In one embodiment, the gateways (GWs) are turned on in numeric order, however, the GW activation order is dependent on the individual GWs availability as determined by a powered network interface detected by the physical machine resource manager.

With continued reference to FIG. 3, at step 609, with continued reference to FIG. 3, the physical machine resource manager (PMRM) 102 enters GW I 104 into an "available for use" queue associated with the (PMRM) 102.

At step 610, the physical machine resource manager (PMRM) initializes GW I 104 as GW I 104 is about to be activated by the physical machine resource manager (PMRM) 102.

At step 612, the physical machine resource manager (PMRM) 102 activates gateway GW I 104 by connecting data bus "A" and data bus "B" to the independent NIC cards, which are physically isolated, on gateway GW I 104. Software on gateway GW I 104 begins to direct data from data bus "B" to data bus "A" and conversely from data bus "A" to data bus "B".

At step 614, GW I 104 is in "open" mode and directs data from data bus "B" to data bus "A" and from data bus "A" to data bus "B". While gateway GW I 104 is in the "open" mode, it may perform any of the following functions. In the "open" mode, all IP traffic is allowed to transit gateway GW I 104 in either direction (i.e., from one data bus to another). This allows the gateway to be inserted without affecting any network traffic. As mentioned in the FIG. 1 description this could be the default powered down state for the secured layered iterative gateway (SLIG), however it would not be a secure mode of operation.

While in the "open" mode, a gateway computer component 104, 106, 108 may perform any of the following functions, as initiated by the physical machine resource manager (PMRM) 102.
- FILTERING—this allows port and protocol exclusion of malware attacks and deny hostile network reconnaissance attempts.
- TEMPORAL FILTERING—allows the exclusion of DOS and DDOS and other temporal based packet attacks.
- ROUTING—this allows the gateway (GW) to obfuscate the IP identity of the connected systems or networks further denying hostile computer network reconnaissance.
- CLOSED—No data forwarded but attack and anomalous behavior would still be sent to the AS.
- ONE WAY—this allows the secured layered iterative gateway (SLIG) to act as a one way data-diode between the connected networks.

Figure 4:
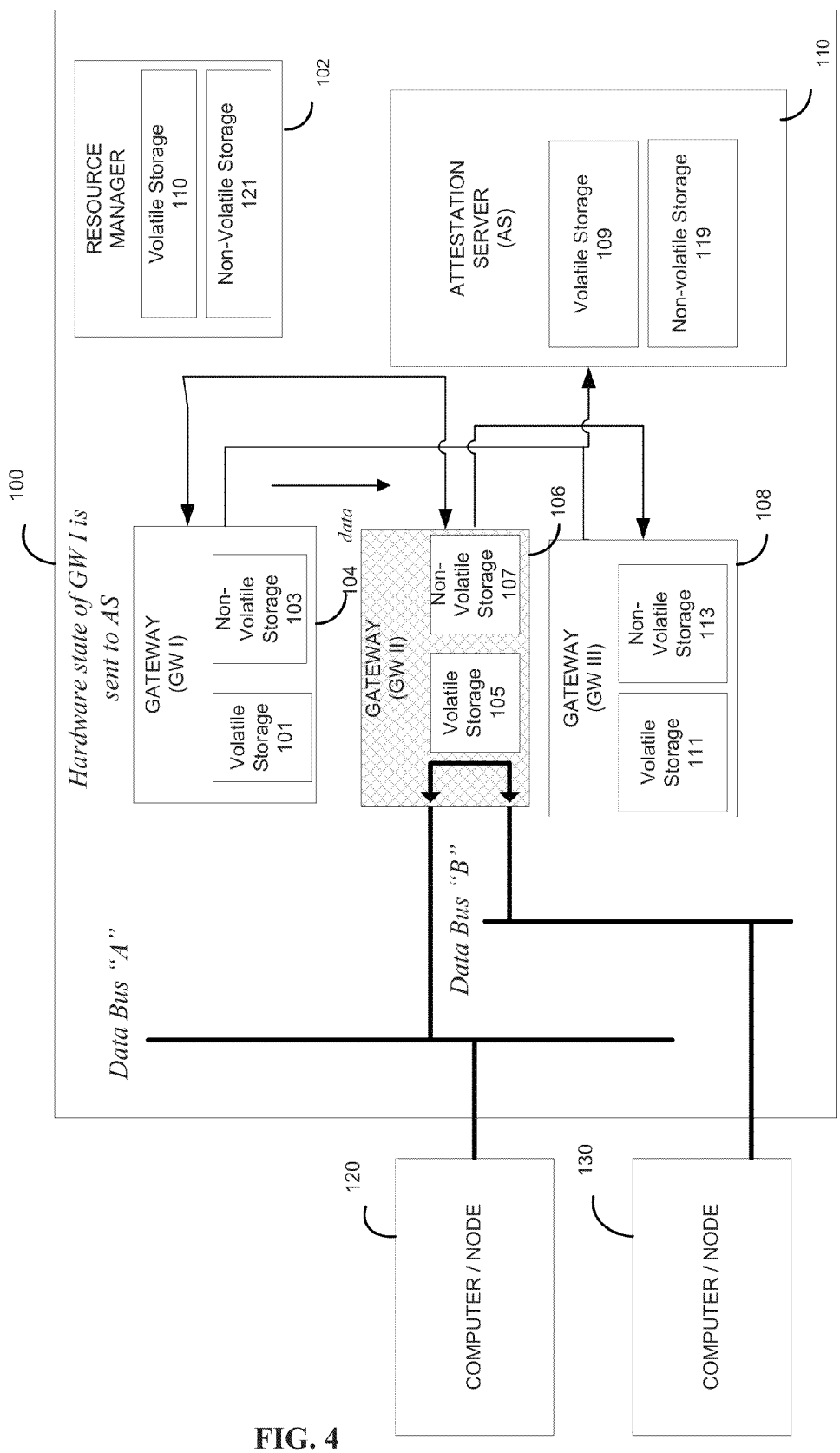

With reference now to FIG. 4, at step 616, the physical machine resource manager (PMRM) 102 activates gateway II (i.e., GW II) 106. This action causes gateway GW I 104 to disconnect from data buses "A" and data bus "B" and connects these data buses to gateway GW II 106 to allow data to flow through the secured layered iterative gateway (SLIG) 100 using gateway GW II 106. In an embodiment, it is desirous to have each gateway (GWs) 104, 106, 108 actively processing network data on the order of 1 second or less. Other embodiments envision longer processing times for each gateway, for example, on the order of 4 seconds.

At step 618, gateway GW I 104 performs a dynamic runtime measurement of its state. Measuring the OS software the compiler BIOS, the NIC cards BIOS' and firmware. The results are hashed and sent to the attestation server (AS) 110. Additional gateway GW I 104 status is included in the data sent to the attestation sever (AS) 110 including, in one embodiment: the number of denied ports, protocols, and packets, the number of allowed packets, and temporal anomalies. The attestation server (AS) 110 verifies the hashes of the hardware and software. If the hashes are determined to be invalid the attestation server (AS) 110 notifies the operator. The hashes are used to detect malware (i.e., cyber activity) that make changes to the Operating System (OS) or to the software (SW) embedded on the firmware of the NICs. Any changes to the SW stored in memory or operating on the firmware would be detectable through the changes to the hash codes. Preferably, the attestation server (AS) 110 also verifies that the boot measurement and dynamic runtime measurements arrived within the appropriate temporal proximity. If not an alert would be generated to the operator. A security enhancement would utilize the iterative crypto-key from the RM.

At step 620 gateway GW I 104 reboots. As gateway GW I 104 reboots it sends a static measurement out to the attestation server (AS) 110.

With reference now to FIG. 5, at step 622, the physical machine resource manager (PMRM) 102 activates GW III 108. This action causes gateway GW II 106 to disconnect from data buses "A" and data bus "B" and connects these data buses to gateway GW III 108 to allow data to flow through the SLIG using gateway GW III 108.

At step 624 gateway GW II 106 performs a dynamic runtime measurement of its state. Measuring the OS software the compiler BIOS, the NIC cards BIOS' and firmware. The results are hashed and sent to the attestation server (AS) 110. Additional gateway GW II 106 status is included in the data sent to the attestation sever (AS) 110 including, in one embodiment: the number of denied ports, protocols, and packets, the number of allowed packets, and temporal anomalies. The attestation server (AS) 110 verifies the hashes of the hardware and software. If the hashes are determined to be invalid the attestation server (AS) 110 notifies the operator. The hashes are used to detect malware (i.e., cyber activity) that make changes to the Operating System (OS) or to the software (SW) embedded on the firmware of the NICs. Any changes to the SW stored in memory or operating on the firmware would be detectable through the changes to the hash codes. Preferably, the attestation server (AS) 110 also verifies that the boot measurement and dynamic runtime measurements arrived within the appropriate temporal proximity. If not an alert would be generated to the operator. A security enhancement would utilize the iterative crypto-key from the RM.

At step 626, GW II 106 reboots. As gateway GW II 106 reboots it sends a static measurement out to the attestation server (AS) 110.

At step 628, the physical machine resource manager (PMRM) 102 activates GW III 108. This action causes gateway GW II 106 to disconnect from data buses "A" and data bus "B" and connects these data buses to GW III 108 to allow data to flow through the secured layered iterative gateway (SLIG) 100 using GW III 108.

In an embodiment, it is desirous to have each gateway 104, 106, 108 actively processing network data on the order of 1 second or less.

Figure 7:
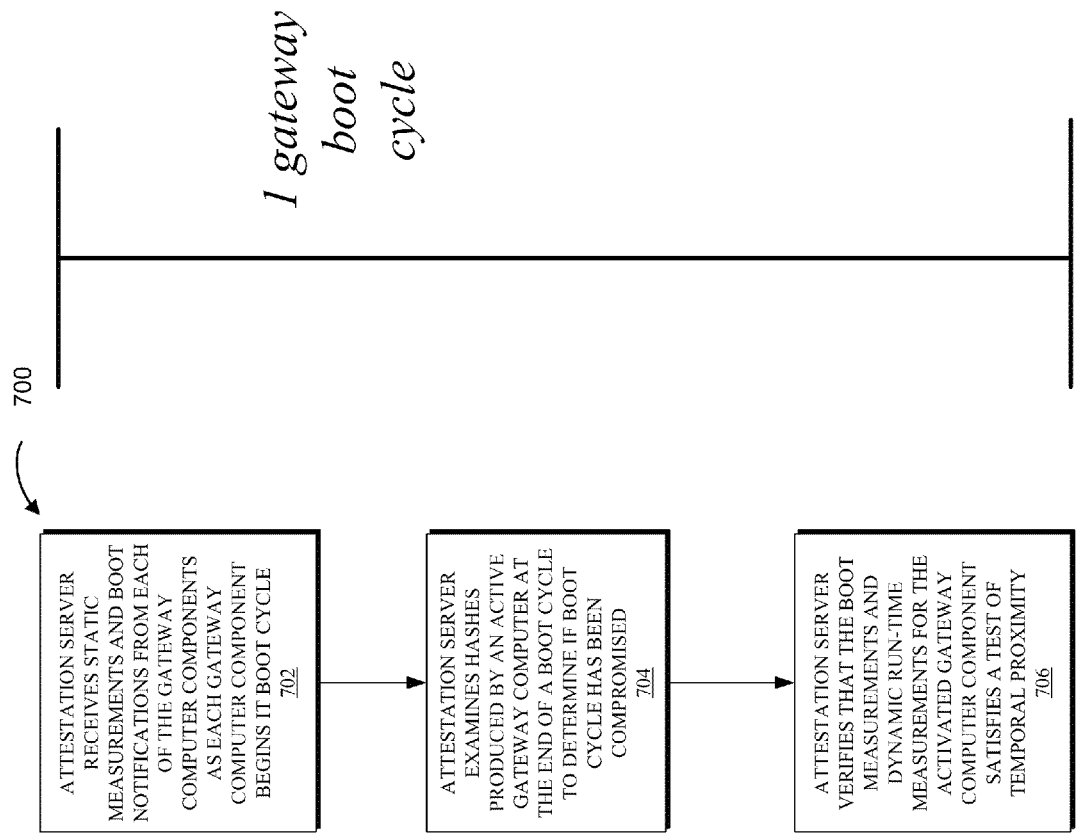
FIG. 7 is a flowchart of steps performed in accordance with one embodiment of the present invention for actions performed by the attestation server (AS) in each cycle of operation of the SLIG.

FIG. 7 are a flowchart 700 of steps performed in accordance with one embodiment of the present invention for actions performed by the attestation server (AS) 110 in each boot cycle of the operation of the SLIG 100. Flowchart 700 includes processes which, in one embodiment, are carried out by processors and electrical components under the control of computer readable and computer executable instructions. The computer readable and computer executable instructions reside, for example, in data storage features such as computer usable volatile memory 101, 109, 110 and/or computer usable non-volatile memory 103, 107, 113 associated with the respective components 102, 104, 106, 108, 110 of the SLIG 100 of FIGS. 1-5. However, the computer readable and computer executable instructions may reside in any type of computer readable medium. Although specific steps are disclosed in flowchart 700, such steps are exemplary. That is, exemplary embodiments of the present invention are well suited to performing various other steps or variations of the steps recited in FIG. 7. Within the present embodiment, it should be appreciated that the steps of flowchart 700 may be performed by software, by hardware or by any combination of software and hardware.

At step 702, the attestation server is configured to receive static measurements and boot notifications from each of the gateways, one gateway per cycle, as each of the gateways begin their boot cycle, At step 704, the attestation server is further configured to examine hashes produced by each gateway, one gateway per cycle, at the end of a boot cycle to determine if a boot cycle has been compromised.

At step 706, the attestation server (AS) 110 is also configured to verify that the boot measurements and dynamic runtime measurements arrive within an acceptable temporal proximity.

FIG. 8 are a flowchart 800 of steps performed in accordance with one embodiment of the present invention for actions performed by the physical machine resource manager (RM) 102 in each boot cycle of the operation of the SLIG 100. Flowchart 800 includes processes which, in one embodiment, are carried out by processors and electrical components under the control of computer readable and computer executable instructions. The computer readable and computer executable instructions reside, for example, in data storage features such as computer usable volatile memory 101, 109, 110 and/or computer usable non-volatile memory 103, 107, 113 associated with the respective components 102, 104, 106, 108, 110 of the SLIG 100 of FIGS. 1-5. However, the computer readable and computer executable instructions may reside in any type of computer readable medium. Although specific steps are disclosed in flowchart 700, such steps are exemplary. That is, exemplary embodiments of the present invention are well suited to performing various other steps or variations of the steps recited in FIG. 8. Within the present embodiment, it should be appreciated that the steps of flowchart 800 may be performed by software, by hardware or by any combination of software and hardware.

At step 802, the resource manager (RM) 102 is configured to continuously monitor the state of the network connections for power.

At step 804, the resource manager (RM) 102 is configured analyze the gateway computer components to identify the existence of an active port associated with any one of the gateway computer components.

At step 806, the resource manager (RM) 102 is configured to send a set of initialization parameters to any gateway computer component for which an active port was recognized.

At step 808, the resource manager (RM) 102 is configured to enter the gateway computer component which has been sent the set of initialization parameters into an active queue.

At step 810, the resource manager (RM) 102 is configured to select one of the available gateway computer components from the active queue for use in a current cycle of operation.

At step 812, the resource manager (RM) 102 is configured to activate the selected gateway computer component by connecting data bus "A" and data bus "B".

At step 814, the resource manager (RM) 102 deactivates the selected gateway disconnecting data bus "A" and data bus "B" and prompts the gateway to reboot.

The above-described steps defined in the flowcharts of FIGS. 6-8 can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a processor. For example, the software may be stored in a volatile or non-volatile memory associated with any one of the gateway computer components, the physical machine resource manager and the attestation server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

Software embodying the present invention may be distributed in known manners, such as on computer-readable medium which contains the executable instructions for performing the methodologies discussed herein. Alternatively, the software may be distributed over an appropriate communications interface so that it can be installed on the user's computer system. Furthermore, alternate embodiments which implement the invention in hardware, firmware or a combination of both hardware and firmware, as well as distributing the modules and/or the data in a different fashion will be apparent to those skilled in the art.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the function specified in the illustrations. Accordingly, the figures herein support combinations of means for performing the specified functions, combinations of steps for performing the specified functions, and program instruction means for performing the specified functions.

While there has been described herein the principles of exemplary embodiments of the invention, it is to be understood by those skilled in the art that this description is made only by way of example and not as a limitation to the scope thereof. For example, while specific implementations in one and two-dimensional applications are described in detail herein, three-dimensional data can be compressed using the same inventive method and specific implementations for doing so are intended to be covered by the present claims and will be readily apparent to artisans of ordinary skill. Accordingly, it is intended by the appended claims, to cover all modifications of the invention which fall within the true spirit and scope of the invention.

What is claimed is:

1. A method for identifying malware activity between computers via an intermediary distributed device, the method comprising:

a) activating, by a physical machine resource manager of the intermediary distributed device, one of at least two gateway components of the intermediary distributed device;

b) communicatively coupling a first network node and a second network node via the activated gateway component to allow data to be bi-directionally transmitted between the first and second network nodes for a finite time period;

c) de-activating, by the physical machine resource manager, the activated gateway component at the termination of the finite time period;

d) analyzing data obtained by the activated gateway component during the finite time period by an attestation server to determine if malware activity has occurred;

e) rebooting the activated gateway component; and f) repeating steps (a)-(e) utilizing another one of the at least two gateway components not previously selected in the most recent finite time period.

2. The method of claim 1, wherein the activating step (a) further comprises:

i) identifying, at the physical machine resource manager, all available gateway components from among the at least two gateway components;

ii) selecting, at the physical machine resource manager, one of the available gateway components for activation.

3. The method of claim 2, wherein the identifying step further comprises: sending initialization parameters from the physical machine resource manager to the identified active gateway component.

4. The method of claim 3, whereby the initialization parameters comprise at least one of: an identifier of an allowed port on the identified active gateway component, one or more temporal filtering parameters, packet size constraints, and a gateway state.

5. The method of claim 4, wherein the comparison further comprises:

determining that both the static and dynamic run-time measurements are available for comparison; and comparing the static and dynamic run-time measurements to insure that inertial message pointers point to valid areas of activity.

6. The method of claim 2, further comprising performing an initialization procedure prior to said identifying step, at the physical machine resource manager, by all available gateway components, said initialization procedure comprising:

i) verifying control connections to a first data bus coupled to a first network, ii) node and to a second data bus coupled to the second network node, iii) performing at least one static measurement, by the at least two gateway components upon boot up to ensure that the at least two gateway components are in a known good state, and iv) verifying the at least one static measurement by the attestation server component.

7. The method of claim 1, further comprising, prior to said activating step:

performing a self-boot procedure by the at least two gateway components;

creating a static measurement by the at least two gateway components;

sending the static measurements of the at least two gateway components to the attestation server storing the static measurements at the attestation server.

8. The method of claim 7, wherein the analyzing step further comprises: measuring, by the deactivated gateway component, the state of the de-activated gateway component to generate a dynamic run-time measurement of the state of the de-activated gateway component; sending the dynamic run-time measurement to the attestation server; comparing the previously stored static measurement with the dynamic run-time measurement for the de-activated gateway server to determine if malware activity has occurred during the finite time period.

9. The method of claim 1, wherein the network is one of an internet protocol (IP) network, a serial interface, and a spanning tree.

10. The method of claim 1, further comprising recording, at the intermediary distributed device, the occurrence of any malware activity which occurred during the finite time period.

11. The method of claim 1, further comprising alerting an operator to the occurrence of malware activity in accordance with determine if malware activity has occurred during the finite time period.

12. The method of claim 1, wherein the finite time period is from 1 second to 5 seconds.

13. A method for identifying malware activity between network nodes of a network via an intermediary distributed device, the method comprising:
  a) activating, by a physical machine resource manager of the intermediary distributed device, one of at least two gateway components of the intermediary distributed device;
  b) communicatively coupling a first network node and a second network node via the activated gateway component to allow data to be bi-directionally transmitted between the first and second network nodes for a finite time period;
  c) de-activating, by the physical machine resource manager, the activated gateway component at the termination of the finite time period;
  d) analyzing data obtained by the activated gateway component during the finite time period by an attestation server to determine if malware activity has occurred;
  e) rebooting the activated gateway component; and
  f) repeating steps (a)-(e) utilizing another one of the at least two gateway components not previously selected in the most recent finite time period.

\* \* \* \* \*